United States Patent Office 3,394,058
Patented July 23, 1968

3,394,058
SEPARATION OF FORMIC ACID AND WATER FROM ACETIC ACID BY DISTILLATION WITH AN ENTRAINER
Heinz Hohenschutz, Mannheim, Germany, assignor to Badische Anilin- & Soda-Fabrik Aktiengesellschaft, Ludwigshafen (Rhine), Germany
No Drawing. Filed Sept. 7, 1965, Ser. No. 485,600
Claims priority, application Germany, Sept. 11, 1964, B 78,482
3 Claims. (Cl. 203—60)

ABSTRACT OF THE DISCLOSURE

A process for working up aqueous acetic acid containing up to 3% by weight of formic acid with the simultaneous separation of water and formic acid by rectifying the aqueous acetic acid in the presence of an entrainer which forms with water low-boiling mixtures having boiling points of from 65° to 97° C. at atmospheric pressure. In the rectification zone, below the supply point for the mixture to be separated a zone is maintained which has at least 10 theoretical trays and in which the temperature is about the same as the boiling temperature of acetic acid, and above the supply point for the mixture to be separated a zone is maintained which has at least two theoretical trays, the lower zone always being longer than the upper zone.

---

This invention relates to a new process for working up mixtures containing acetic acid by distillation by means of an entrainer.

A number of methods are known for the production of acetic acid in which it is obtained mixed with water. If the water content is only low, such mixtures are best worked up by simple distillation. This is possible because acetic acid and water do not form an azeotrope. When the water content is high, its is recommendable to extract the acetic acid with an organic solvent which is immiscible with water. In the case of medium water contents however it is most advantageous to remove the water by azeotropic distillation. Examples of suitable entrainers are particularly esters, with or without the addition of alcohols or hydrocarbons (see for example U.S. patent specification No. 3,052,610 and German patent specification No. 946,799). A portion of the byproducts formed in the synthesis of acetic acid is used as an entrainer in the process according to U.S. patent application Serial No. 380,917 filed on July 7, 1964 by Heinz Hohenshutz.

It is a common feature of all the prior art methods that formic acid for the most part remains in the acetic acid during dehydration. The formic acid can be separated from the acetic acid in a subsequent distillation. This requires a high expenditure, however, because of the unfavorable shape of the vapor pressure curves. Separation of formic acid by azeotropic distillation using chloroform or paraffinic hydrocarbons as entrainers as described in U.S. patent specification No. 3,024,170 and in British patent specification No. 727,078 also involves great expense which is not warranted by the value of the formic acid recovered. This is especially so when the formic acid content is less than 3% by weight with reference to the acetic acid.

Thermal decomposition of the formic acid by passing the acid mixture over a catalyst has also been recommended (U.S. patent specification No. 2,656,379). For this purpose, however, the whole of the acid mixture has to be vaporized and heated to the decomposition temperature. Moreover water is formed in the decomposition and this has to be removed subsequently from the acetic acid. According to French patent specification No. 1,101,188, the formic acid is decomposed by means of acetic anhydride which is thus converted into the less valuable acetic acid.

It is an object of this invention to provide a process by which water and formic acid can be removed simultaneously by azeotropic distillation, i.e. by means of an entrainer, from aqueous acetic acid containing a small amount of formic acid. Another object of the invention is to provide a process of the said type in which a mixture containing acetic acid is worked up which has been obtained by reaction of methanol with carbon monoxide and in which neutral substances formed during the said reaction are used as the entrainer. A further object of the invention is to provide a process for working up aqueous acetic acid containing a small amount of formic acid which is distinguished by a small expenditure of energy and by the fact that no additional assistants, such as acetic anhydride, are necessary. Other objects of the present invention will be evident from the following description.

In accordance with this invention it has been found that the said objects and advantages can be achieved and aqueous acetic acid containing small amounts of formic acid can be freed from water and formic acid by rectification in the presence of an entrainer for water which forms with water low boiling point mixtures having boiling points at atmospheric pressure of from 65° to 97° C., especially from 75° to 95° C., by maintaining in the rectification zone below the supply of the mixture to be separated a zone in which the temperature is about equivalent to the boiling temperature of acetic acid, this zone being longer, the longer the zone between the supply of the mixture to be separated and the upper end of the rectification zone.

An acetic acid having a formic acid content of less than 0.02% by weight is obtained according to the new process. Surprisingly it is possible to withdraw the formic acid at the top of the rectification zone although formic acid and water for a maximum azeotrope having a boiling point of 107° C. at 760 mm. Hg and the temperature at the top of the rectification zone is only 65° to 97° C. depending on the entrainer used.

The new process is particularly suitable for working up mixtures containing acetic acid, water and formic acid and having medium or high contents of acetic acid and low contents of formic acid. For example mixtures which consist substantially of 30 to 85% by weight of acetic acid, 10 to 60% by weight of water and up to 3%, particularly from 0.3 to 3%, by weight of formic acid are well suited to the process. They may also contain small amounts, for example up to 20%, by weight, of other accompanying substances. These may be low boiling constituents having no entraining power for water themselves, such as methanol, or may be high boiling point constituents which do no distil over either alone, with water or with other substances contained in the mixture and therefore remain in the acetic acid and are separated in a subsequent distillation, such as propionic acid.

It is an essential feature of this new process that entrainers are used which with water form azeotropes which boil at between 65° and 97° C., especially between 75° and 95° C. Examples of suitable entrainers are esters of lower saturated aliphatic carboxylic acids having one to four carbon atoms and alkanols having one to six carbon atoms, saturated aliphatic or cycloaliphatic aldehydes which, apart from the aldehyde groups, have hydrocarbon structure and contain 4 to 8 carbon atoms, alkanones having 4 to 8 carbon atoms, and cycloalkanones having five or six carbon atoms, only those representatives of the said classes of substances being suitable which with water form azeotropes boiling at between 65° and 97° C., especially 75° and 95° C., at atmospheric pressure. The following may be given as examples of suitable entrainers: butyl formate, propyl acetate, butyl acetate, 2-ethylbutyl acetate, n-butyraldehyde, 2-ethylbutanal, 2-ethylhexanal, cyclohexyl aldehyde, methyl propyl ketone, methyl ethyl ketone, diethyl ketone, cyclopentanone. Understandably the amount of entrainer will depend on the type thereof, on the water content and possibly also on the composition of the mixture to be separated. Furthermore, it is understandable that the amount of entrainer in the rectification zone must always be sufficient for the removal of the water supplied thereto. If there be inadequate entrainer in the rectification zone, an aqueous acetic acid will distil over. If the content of entrainer in the rectification zone should increase appreciably beyond the amount required for dehydration, some of the entrainer (if its boiling point is high enough) may remain in the distillation residue, i.e. in the acetic acid. The vapors leaving the top of the rectification zone are cooled; the entrainer, which separates as an individual phase, is returned to the rectifying zone. Since the entrainer is recycled, the amount required is only small with reference to the whole of the mixture to be separated. Sometimes it is advantageous to return a portion of the aqueous phase of the condensate to the rectification zone.

Mixtures which have been formed by reaction of methanol, with or without an addition of dimethyl ether and/or methyl acetate, with carbon monoxide at temperatures of from about 180° to 350° C. and pressures of from about 200 to 700 atmospheres using cobalt iodide as catalyst may be worked up particularly favorably according to the new process. Low boiling point components, such as methyl acetate and dimethyl ether, are first substantially separated from the reaction mixture immediately obtained, and then in a second column the bulk of the vaporizable constituents is distilled off. The acetic acid is then dehydrated and freed from formic acid in a third column, neutral substances formed in the course of the synthesis being used as entrainers and the aqueous phase being returned to the acetic acid synthesis. When static conditions have been set up, the mixture to be dehydrated which is introduced into the third column has the following approximate composition:

40 to 60% by weight of acetic acid,
30 to 50% by weight of water,
1 to 3% by weight of formic acid,
10 to 30% by weight of neutral substances (mainly acetates of methanol, ethanol, butanol and higher alcohols, and also aldehydes, such as butyraldehyde, 2-ethylbutanal and 2-ethylhexanal) and
1 to 3% by weight of higher carboxylic acids (mainly propionic acid).

Acetic acid which is free from water and formic acid may be separated particularly favorably from mixtures of the said kind. The aqueous phase, which contains the separated formic acid, may be returned to the acetic acid synthesis without the formic acid accumulating in the cycle. Evidently there is equilibrium between fresh formation and decomposition of formic acid, which is formed from carbon monoxide and water according to the equation

$$CO + H_2O \rightleftharpoons HCOOH$$

and surprisingly this equilibrium is reached in spite of the high partial pressure of carbon monoxide of 300 to 700 atmospheres gauge and water contents of 30 to 50% by weight at the reaction temperatures if the crude acetic acid mixture contains 1 to 3% by weight of formic acid.

The process according to this invention is usually carried out at atmospheric pressure. It is possible however to use slightly subatmospheric or slightly superatmospheric pressure, for example pressures from 300 mm. Hg to 5 atmospheres. The reflux ratio is usually from 0.5:1 to 15:1.

Another important feature of the process according to this invention is that by appropriate heating below the point of supply of the feedstock a zone is maintained in which the temperature is about equivalent to the boiling temperature of acetic acid, i.e. deviating about ±5° C. from the boiling temperature. The temperature of this zone is from about 116° to 123° C. when using atmospheric pressure or the working pressure of the column. The longer the zone between the point of introduction of the feedstock and the top of the rectification zone, the longer the abovementioned zone must be. In practice it is advantageous to use columns having at least twenty theoretical trays and particularly columns having thirty to fifty theortical trays. The feedstock is introduced in the upper fourth of the column. It is advantageous for at least two, preferably two to ten, theoretical trays to be present above the point of supply of the feedstock. The zone in which a temperature substantially equivalent to the boiling temperature of acetic acid is maintained may extend from the bottom of the column to about half the height of the column, i.e. including at least ten and advantageously fifteen to twenty-five theoretical trays. Understandably it is not possible to propound any general rule as to the ratio of the length of the zone in which substantially the boiling temperature of acetic acid prevails to the length of the zone situated above the point of supply of the feedstock. This ratio depends primarily on the content of water and acetic acid in the mixture. In the case of the abovementioned mixtures originating from the reaction of methanol with carbon monoxide, it is in general advantageous to maintain a ratio of the said zones of 3:1 to 9:1. If the acetic acid withdrawn at the bottom still contains appreciable amounts of formic acid, the zone in which substantially the boiling temperature of acetic acid prevails must be lengthened. By varying the length of the said zone in which substantially the boiling temperature of acetic acid prevails, the optimum conditions under which the acetic acid is substantially dehydrated and freed from formic acid but is not codistilled in large amounts may easily be determined.

The following example will further illustrate this invention.

Example

A dehydrating column having fifty practical trays is operated at atmospheric pressure. 855 kg. per hour of a vapor mixture (obtained from a crude acid product of the reaction of methanol with carbon monoxide after the low boiling components and the catalyst have been separated, and containing 50% by weight of acetic acid, 2.0% by weight of formic acid, 34% by weight of water, 12.6% by weight of neutral substances (mainly acetates of methanol, ethanol, butanol and higher alcohols, and also aldehydes, such as butyraldehyde, 2-ethylbutanal and 2-ethylhexanal) and 1.4% by weight of higher carboxylic acids) is introduced above the 44th plate.

A vapor mixture is withdrawn at the top of the column which consists of the azeotrope of water with the neutral substances, small amounts of acetic acid and practically the whole of the formic acid; the mixture is condensed and separated in a separating vessel into two phases. The upper layer is returned to the column as a reflux. The lower layer, amounting to 417 kg./hour and containing (at 4.1% by weight) practically the whole of the formic acid with 69.8% by weight of water, 1.6% by weight of acetic acid and 24.7% by weight of neutral substances, is withdrawn and mixed with the feedstock for the acetic acid synthesis. The bottom of the column has such an amount of heat supplied to it by indirect steam heating that the temperature falls from 123° to 116° C. from the bottom to the twenty-fifth tray.

438 kg. per hour of anhydrous acetic acid is withdrawn as bottom product; it contains less than 0.02% by weight of formic acid, 2.7% by weight of higher carboxylic acids and 1.1% by weight of neutral substances.

Although the formic acid is recycled to the acetic acid plant, there is no increase above 2% in the formic acid content of the feed to the dehydration column even after the acetic acid plant has been operated for several months.

I claim:

1. A process for working up mixtures containing 40 to 60% by weight of acetic acid, 30 to 50% by weight of water, 1 to 3% by weight of formic acid, 10 to 30% by weight of neutral substances and 1 to 3% by weight of higher carboxylic acids, said percentages being based on the total mixture, with the simultaneous separation of water and formic acid, which process comprises: rectifying said aqueous acetic acid mixture in the presence of an entrainer which forms with water an azeotrope boiling at from 65° to 97° C. at atmospheric pressure, said entrainer being selected from the group consisting of esters of lower saturated aliphatic carboxylic acids having one to four carbon atoms and alkanols having one to six carbon atoms, saturated aliphatic and cycloaliphatic aldehydes which, apart from the aldehyde groups, have hydrocarbon structure and contain 4 to 8 carbon atoms, alkanones having 4 to 8 carbon atoms, and cycloalkanones having five and six carbon atoms maintaining in the rectification zone below the supply point for the mixture to be separated a zone comprising at least ten theoretical trays and in which the temperature is about equivalent to the boiling temperature of acetic acid, and maintaining above the supply point for the mixture to be separated a zone comprising at least two theoretical trays, the zone below said supply point being longer than the zone above said supply point.

2. A process as claimed in claim 1 wherein the entrainer used forms with water a low boiling point mixture having a boiling point of from 75 to 95° C. at atmospheric pressure.

3. A process as claimed in claim 1 wherein the aqueous acetic acid worked up is one containing 40 to 60% by weight of acetic acid, 30 to 50% by weight of water, 0.3 to 3% by weight of formic acid and 10 to 30% by weight of neutral substances, which has been obtained by reaction of methanol with carbon monoxide at temperatures of from about 180 to 350° C. at pressures of from about 200 to 700 atmospheres using cobalt iodide as catalyst, and wherein the said neutral substances serve as the entrainer.

References Cited

UNITED STATES PATENTS

| | | | |
|---|---|---|---|
| 2,050,234 | 8/1936 | Othmer | 203—16 |
| 3,024,170 | 3/1962 | Othmer et al. | 203—67 |
| 3,060,233 | 10/1962 | Hohenschutz | 260—541 |
| 3,214,347 | 10/1965 | Grekel et al. | 203—62 |

WILBUR L. BASCOMB, JR., *Primary Examiner.*